United States Patent [19]

Mortimer

[11] 4,246,395

[45] Jan. 20, 1981

[54] 6T/6I TERPOLYAMIDE

[75] Inventor: George A. Mortimer, Lake Charles, La.

[73] Assignee: Monsanto Company, St. Louis, Mo.

[21] Appl. No.: 60,311

[22] Filed: Jul. 25, 1979

[51] Int. Cl.$^3$ .............................................. C08G 69/26
[52] U.S. Cl. .................................... 528/208; 528/211; 528/338; 528/339; 528/340; 528/336; 528/344; 528/345; 528/346; 528/347
[58] Field of Search ............... 528/338, 339, 340, 345, 528/346, 347, 211, 208

[56] References Cited

U.S. PATENT DOCUMENTS

| | | | |
|---|---|---|---|
| 3,926,924 | 12/1975 | Edgar et al. | 528/347 |
| 3,941,755 | 3/1976 | Chapman et al. | 528/347 |
| 4,022,756 | 5/1977 | Chapman et al. | 528/347 |
| 4,113,708 | 9/1978 | Chapman et al. | 528/313 |

*Primary Examiner*—Harold D. Anderson
*Attorney, Agent, or Firm*—John W. Whisler

[57] ABSTRACT

Fiber-forming 6T/6I terpolyamides having melting points below 320° C., glass transition temperatures above 115° C. and good thermal stablities are provided. The terpolyamides may be prepared by melt polymerization and melt spun into useful fibers.

11 Claims, No Drawings

6T/6I TERPOLYAMIDE

BACKGROUND OF THE INVENTION

A. Field of the Invention

This invention relates to novel fiber-forming terpolyamides which are prepared by melt polymerization techniques and have melting points (Tm) below 320° C., glass transition temperatures (Tg) above 115° C. and good thermal stabilities.

B. Description of the Prior Art

Copolymers prepared by the melt polymerization of a mixture (e.g. 60/40) of hexamethylene diammonium terephthalate and hexamethylene diammonium isophthalate (i.e. 6T and 6I salts) and the melt spinning of each 6T/6I copolymers into useful fibers are described in U.S. Pat. Nos. 3,941,744; 4,022,756 and 4,113,708.

Although 100% 6T polymer (i.e. polyhexamethylene terephthalamide) has a high Tg, it also has a Tm too high (above 320° C.) for it to be easily melt processed. While replacing a portion of the terephthalic acid with isophthalic acid lowers the Tm while preserving the high Tg, the resulting 6T/6I copolymer, lacks crystallinity.

Terpolymers produced from 6T salt, 6I salt and hexamethylene diammonium adipate (66 salt) are described in British Pat. No. 1,526,329. Although these terpolymers have lower melting points and are easier to melt process than 6T/6I copolymers at the same 6T concentration, they have reduced thermal stability.

It is an object of the present invention to provide fiber-forming polyamides having high Tg values, melting point values below 320° C., and better thermal stabilities than 6T/6I/66 terpolymers.

It is a further object of the invention to provide fiber-forming polyamides of the foregoing description which can be prepared by melt condensation from aqueous solution of the appropriate salts or monomers.

Other objects and advantages of the invention will become apparent to those skilled in the art from the following description.

SUMMARY OF THE INVENTION

In accordance with the present invention there is provided by melt condensation from aqueous solution of appropriate salts and/or monomers a fiber-forming polyamide consisting essentially of recurring units of which:

(i) 5 to 20% are selected from the group consisting of

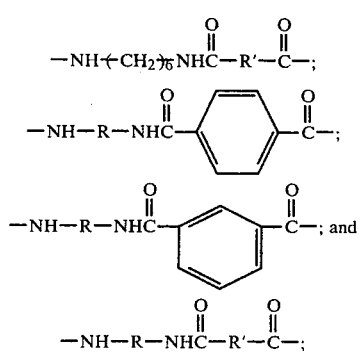

(ii) 20 to 40% are

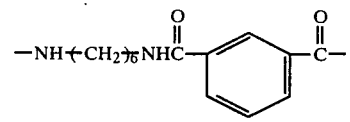

and (iii) the remainder thereof are

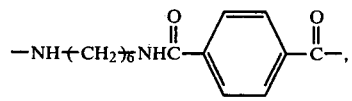

wherein R is a divalent cycloaliphatic radical or a $C_{12}$ to $C_{20}$ divalent alkenyl radical and R' is an R radical or a divalent aromatic radical other than a phenyl radical.

The polyamides of the present invention have melting points (Tm) below 320° C. and, preferably, below 300° C., glass transition temperatures (Tg) above 115° C. and, preferably, above 125° C. and thermal stabilities corresponding to f(b) values less than 1.4 and, preferably, less than 1.0.

Fiber prepared from the polyamides of the present invention has useful properties for textile applications, including high Tg, thermal stability and dimensional stability. The polyamides of the present invention may also be used as molding resins and coatings.

DESCRIPTION OF THE PREFERRED EMBODIMENTS

The polyamides of the present invention may be prepared by conventional melt condensation procedures where an aqueous solution of a mixture of appropriate salts is heated under conditions of controlled time, temperature and pressure to remove the water and effect polymerization. The mixture of salts consists of 20% to 40%, of 6I, 45% to 75% of 6T and 5% to 20% of one or more salts formed by reacting substantially equimolar amounts of (i) one or more diamines of the formula $NH_2-R-NH_2$ with isophthalic and/or isophthalic and/or terephthalic and and/or (ii) hexamethylenediamine with one or more diacids of the formula $HOOC-R'-COOH$, wherein R is a divalent cycloaliphatic radical or a $C_{12}$ to $C_{20}$ divalent alkenyl radical and R' is an R radical or a divalent aromatic radical other than phenylene. Representative R radicals include

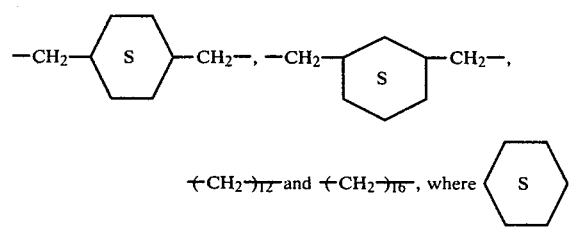

represents a cyclohexane ring. Representative R' radicals include

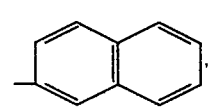

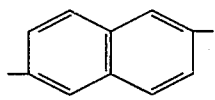

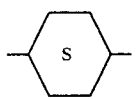

and —R—. Thus, the polyamides of the present invention may be viewed as modified 6T/6I copolymers which are prepared by appropriately replacing 5% to 20% of the hexamethylenediamine, iso- or terephthalic acid or a mixture of at least two thereof with a corresponding amount of one or more of the abovementioned diamines and/or diacids. Instead of using an aqueous solution of the salts, an aqueous solution of the individual monomers or an amide-forming derivative thereof may be used if desired.

The polyamides of the invention can be prepared by melt condensation and melt processed into fibers or other shaped articles over a wide range of temperatures.

The following examples are given to further illustrate the invention. In the examples melting point temperatures (Tm) and glass transition temperatures (Tg) were determined by the differential scanning calorimetry (DSC) method using a Perkin-Elmer DSC-2 instrument set to cycle automatically between 47° and 347° C. at a heating and cooling rate of 40° C. per minute using a 10 gram spun yarn sample. Each sample was subjected to three cycles: an initial heating cycle, a cooling cycle and a reheating cycle. The instrument was equipped to print out a thermogram curve of each cycle. The thermogram curve obtained upon the initial heating cycle reflected the crystallinity of the particular yarn sample (i.e. whether spun or drawn yarn) and whether the sample was dry or wet and the configuration of the sample in the container. Upon cooling the first thing observed was a large exotherm due to recrystallization of the sample. As the sample cooled beyond the crystallization point, a shift in the slope of the base line is observed. Straight line extropolations of the two base lines of differing slopes was made on the cooling cycle curve and the point of their intersection was noted. After cooling, the sample was reheated. Upon reheating the first thing observed was a sigmoidial shift in the base line. Straight line extropolations of the first base line and the maximum apparently linear slope of the shifted line half way through the sigmoidial shift was made on the reheating cycle curve and the point of their intersection was noted. (The temperature at the intersections of the straight line extropolations on both the cooling cycle and reheating cycle curves were at the same temperature within experimental error). The temperature at the intersection point taken from the cooling curve and that taken from the reheating curve were averaged and the average temperature was reported as the Tg value of the sample. The melting point temperature (Tm) of a sample was taken as that temperature corresponding to the maximum of the melting endotherm obtained during the reheating cycle.

The polymer melt thermal stability values were determined by the Newtonian limiting viscosity method and are expressed herein in terms of f(b) where $$f(b) = 100 \left( \frac{1}{\eta_{ot}^{0.294}} - \frac{1}{\eta_{oz}^{0.294}} \right).$$

This equation was derived in the following manner. If $\overline{DP}$ represents the number average degree of polymerization of a polymer, p represents the fraction of all possible polymer bonds that have been formed in obtaining $\overline{DP}$, and b represents the fraction of all possible polymer bonds which are broken during thermal treatment (i.e. by being held in the melt at 325° C. for 30 minutes), then the degree of polymerization prior to (1) and after (2) (thermal treatment) can be expressed as follows:

$$\overline{DP} = 1/(1-p) \qquad (1)$$

$$\overline{DP} = 1/(1-p+b) \qquad (2).$$

If Z represents the subscript for polymer at zero thermal treatment and t represents then by combining (1) and (2) and solving for b the following equation is obtained:

$$b = 1/\overline{DP}_t - 1/\overline{DP}_z \qquad (3).$$

Molecular weight can be expressed in terms of viscosity data according to the general equation:

$$\eta = KM^a \qquad (4)$$

where $\eta$ is any viscosity, M is the appropriate molecular weight average, a is the exponent to which M is to be raised and K is the coefficient applicable to the M being used. If M is $\overline{M}w$ (weight average molecular weight), a is 3.4 (the power law exponent), and k is suitable defined, then $\eta$ in (4) is $\eta o$ (the limiting Newtonian melt viscosity). By substituting (4) into (3) and solving for a function of the polymer bonds broken in terms of the viscosities before and after thermal treatment the following equation is obtained (where $Q\overline{DP}=M$; Q is a constant):

$$b/QK^{1/a} = 1/\zeta_t^{1/a} - 1/\zeta_z^{1/a} \qquad (5).$$

Thus, where $M = Ww, = o$ and $a = 3.4$, equation (5) becomes:

$$f(b) = \frac{1}{\eta_{ot}^{1/3.4}} - \frac{1}{\eta_{oz}^{1/3.4}} \qquad (6)$$

$$f(b) = \frac{1}{\eta_{ot}^{0.294}} - \frac{1}{\eta_{oz}^{0.294}} \qquad (7)$$

where $f(b) = b/QK^{0.294}$. Rheological theory suggests that $(1/\eta_o)^{1/3.4}$ is linearly related to $\overline{M}w$.

Using a capillary rheometer (Instron Engineering Corporation of Canton, Massachusetts), $\eta_o$ values (Newtonian limiting, zero shear melt viscosity values) were obtained using the following procedure: (i) after the rheometer had attained thermal equilibrium at 325° C. (test temperature), the polymer sample (which had been dried at 140° C. under >0.05 mm Hg vacuum prior to testing) was loaded and a hold time of six minutes was allowed for melting, after which time the zero shear melt viscosity of the sample was measured ($\eta_{oz}$ = zero shear melt viscosity prior to thermal treatment) and (ii) then, the polymer was held at 325° C. for an additional 30 minutes, after which time the zero shear melt viscosity of the sample was again measured ($\eta_{ot}$ = zero shear melt viscosity after thermal treatment).

EXAMPLE 1

In this example terpolyamides of the present invention were prepared and compared to 6T/6I/66 terpolymer.

A series of 14 filament, 80 denier yarns were prepared using the general melt polymerization and spinning procedure described in Example 1 of U.S. Pat. No. 4,113,708 using 500 ppm, based on the weight of polymer, of NaH$_2$PO$_4$ to reduce branching during polymerization, except that in this instance instead of using a mixture of 6TA and 6IA salts a mixture of salts was used consisting of 58 mole % 6T salt, 32 mole % 6I salt, and 10 mole % of a hexamethylene diammonium salt (6R') of a third diacid. The particular acid used in each instance to prepare the 6R' salt is given in Table 1 along with the Tm, Tg and f(b) values for each yarn. The values given are values obtained by averaging a number of samples, which number is also given in Table 1.

TABLE 1

| Sample | Diacid of Third Salt | Samples Averaged | Tm | Tg | f(b) |
|---|---|---|---|---|---|
| A | adipic acid control | 4 | 306 | 122 | 1.40 |
| B | dodecanedioic acid | 2 | 299 | 118 | 0.95 |
| C | 2,6-naphthalene dicarboxylic acid | 2 | 285 | 135 | 0.92 |
| D | 4,4'-oxydibenzoic acid | 1 | 285 | 133 | 0.53 |
| E | 1,4-cyclohexane dicarboxylic acid | 2 | 311 | 136 | 0.61 |

The results given in Table 1 show that the terpolymers of the present invention (D-G) have high Tg values, melting points below 315° C. and better thermal stability than 6T/6I/66 terpolymers.

EXAMPLE 2

In this example terpolyamide yarns were prepared as described in Example 1 except that in this instance instead of using 10 mole % of a 6R' salt, 10 mole % of a diammonium salt of terephthalic acid RT salt was used. The particular diamine used in each instance to prepare the RT salt is given in Table 1 along with the Tm, Tg and f(b) values of each yarn.

TABLE 2

| Sample | Diamine of Third Salt | Samples Averaged | Tm | Tg | f(b) |
|---|---|---|---|---|---|
| A | control | 4 | 306 | 122 | 1.40 |
| F | 1,3-cyclohexane-bis-methylamine | 1 | 279 | 140 | 0.61 |
| G | 1,4-cyclohexane-bis-methylamine | 2 | 291 | 140 | 0.72 |
| H | dodecamethylene diamine | 4 | 291 | 128 | 0.56 |

The results given in Table 2 show that terpolymers F-H have high Tg values, melting points below 300° C. and better thermal stability than 6T/6I/66 terpolymers.

I claim:

1. A fiber-forming polyamide consisting essentially of recurring units of which:

(i) 5 to 20% are selected from the group consisting of:

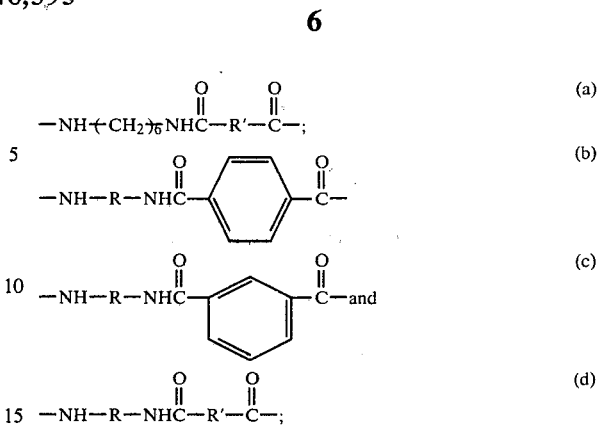

(ii) 20 to 40% are

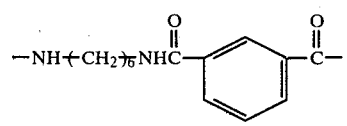

and (iii) the remainder thereof are

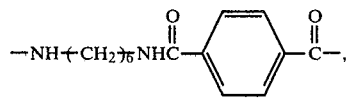

wherein R is a divalent cycloaliphatic radical or a C$_{12}$ to C$_{20}$ divalent alkenyl radical and R' is an R radical or a divalent aromatic radical other than a phenyl radical, said polyamide being characterized in having a melting point below 320° C., a glass transition temperature above 115° C. and a thermal stability corresponding to an f(b) value less than 1.40, wherein f(b) is measured using a capillary rheometer and is defined by the equation $$f(b) = 100 \left( \frac{1}{\eta_{ot}^{0.294}} - \frac{1}{\eta_{oz}^{0.294}} \right),$$

where $\eta_{ot}$ is the Newtonian limiting, zero shear melt viscosity value of a sample of the polyamide after it has been loaded and held in the rheometer for 6 minutes at a temperature of 325° C. and $\eta_{oz}$ is the Newtonian limiting, zero shear melt viscosity value of the same polyamide sample after it has been held in the rheometer for an additional 30 minutes.

2. The polyamide of claim 1 wherein (i) units are of the formula represented by (a).

3. The polyamide of claim 2 wherein R' is

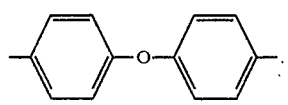

4. The polyamide of claim 2 wherein R' is

5. The polyamide of claim 2 wherein R' is

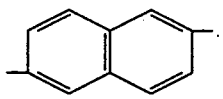

6. The polyamide of claim 2 wherein R' is

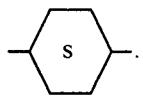

6. The polyamide of claim 2 wherein R' is ‐(CH₂)₁₂.
7. The polyamide of claim 1 wherein (i) units of the formula represented by (b).
8. The polyamide of claim 7 wherein R is

9. The polyamide of claim 7 wherein R is ‐(CH₂)₁₂.
10. The polyamide of claim 7 wherein R is

-CH₂-[S]-CH₂-.

11. The polyamide of claim 1 having a melting point below 300° C., a glass transition temperature of at least 125° C., and a thermal stability corresponding to an f(b) value less than 1.0.

* * * * *